(12) United States Patent
Stapelfeld et al.

(10) Patent No.: US 6,575,120 B1
(45) Date of Patent: Jun. 10, 2003

(54) ANIMAL CONTROL SYSTEM

(75) Inventors: Norval Stapelfeld, Nashua, NH (US); Frederic T. Peterson, Chelmsford, MA (US); Thomas Mariner, North Babylon, NY (US)

(73) Assignee: Dogwatch Inc., Natick, MA (US)

( * ) Notice: Subject to any disclaimer, the term of this patent is extended or adjusted under 35 U.S.C. 154(b) by 0 days.

(21) Appl. No.: 09/658,357

(22) Filed: Sep. 11, 2000

(51) Int. Cl.$^7$ ............................................... A01K 15/02
(52) U.S. Cl. ........................................ 119/720; 119/721
(58) Field of Search ................ 119/721, 720, 119/719

(56) References Cited

U.S. PATENT DOCUMENTS

| | | | | |
|---|---|---|---|---|
| 3,589,337 A | * | 6/1971 | Doss | 119/720 |
| 3,777,712 A | * | 12/1973 | Gardner et al. | 119/719 |
| 3,897,753 A | * | 8/1975 | Lee et al. | 119/51.02 |
| 3,980,051 A | * | 9/1976 | Fury | 119/719 |
| 4,262,632 A | * | 4/1981 | Hanton et al. | 119/51.02 |
| 4,335,682 A | * | 6/1982 | Gonda et al. | 119/719 |
| 4,733,633 A | * | 3/1988 | Yarnall et al. | 119/721 |
| 4,898,120 A | * | 2/1990 | Brose | 119/721 |
| 5,121,711 A | * | 6/1992 | Aine | 119/502 |
| 5,241,923 A | * | 9/1993 | Janning | 119/721 |
| 5,353,744 A | * | 10/1994 | Custer | 119/719 |
| 5,425,330 A | * | 6/1995 | Touchton et al. | 119/721 |
| 5,435,271 A | * | 7/1995 | Touchton et al. | 119/721 |
| 5,460,124 A | * | 10/1995 | Grimsley et al. | 119/721 |
| 5,465,687 A | * | 11/1995 | Custer | 119/719 |
| 5,559,498 A | * | 9/1996 | Westrick et al. | 15/309.1 |
| 5,565,850 A | * | 10/1996 | Yarnall et al. | 119/721 |
| 5,575,242 A | * | 11/1996 | Davis et al. | 119/721 |
| 5,576,694 A | * | 11/1996 | Touchton et al. | 340/573.1 |
| 5,610,588 A | * | 3/1997 | Yarnall et al. | 119/721 |
| 5,682,839 A | * | 11/1997 | Grimsley et al. | 119/721 |
| 5,769,032 A | * | 6/1998 | Yarnall et al. | 119/721 |
| 5,844,489 A | * | 12/1998 | Yarnall et al. | 119/721 |
| 5,852,403 A | * | 12/1998 | Boardman | 119/721 |
| 5,870,973 A | * | 2/1999 | Touchton et al. | 119/721 |
| 5,967,094 A | * | 10/1999 | Grimsley et al. | 119/721 |
| 6,019,066 A | * | 2/2000 | Taylor | 119/719 |
| 6,079,367 A | * | 6/2000 | Stapelfeld et al. | 119/719 |
| 6,166,643 A | * | 12/2000 | Janning et al. | 119/721 |
| 6,191,693 B1 | * | 2/2001 | Sangsingkeow | 340/573.1 |
| 6,269,776 B1 | * | 8/2001 | Grimsley et al. | 89/11 |
| 6,360,698 B1 | * | 3/2002 | Stapelfeld et al. | 119/719 |

* cited by examiner

*Primary Examiner*—Charles T. Jordan
*Assistant Examiner*—Stephen Holzen
(74) *Attorney, Agent, or Firm*—Weingarten, Schurgin, Gagnebin & Lebovici LLP

(57) ABSTRACT

An animal control system is provided in which an AM transmission signal includes qualification criteria which upon proper decoding provides intended stimuli to an animal. The transmit signal comprises modulated pulses having a first amplitude and a second amplitude which upon decoding represent logic zero and logic one states. The receiver employs microprocessor based digital circuitry for decoding and processing of the AM transmit signal. The transmit signal is transmitted in alternating odd and even frames, each of which has particular characteristics and which upon proper decoding by the receiver causes successive weak and strong stimuli to be provided to the animal.

18 Claims, 15 Drawing Sheets

ANIMAL CONTROL SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Animal control systems are well-known. Examples of such a system are found in U.S. Pat. No. 5,465,687 and U.S. Pat. No. 5,353,744, both assigned to the assignee of the present invention and incorporated herein by reference. A transmitter generates a coded Amplitude Modulation (AM) signal that is radiated by a wire-loop antenna which is buried a few inches underground and defines an area within which the animal is to be contained or from which the animal is to be restricted. A receiver mounted on a collar placed around the neck of the animal includes one or more electrodes which are in physical contact with the skin of the animal. As the animal and receiver approach the wire-loop antenna, the receiver detects the radiated AM signal. The received signal is measured and, if the received signal qualifies, that is, meets certain criteria, a stimulus is applied to the animal. The stimulus may be an audible alert and/or an electric shock administered to the animal through the electrodes.

BRIEF SUMMARY OF THE INVENTION

In accordance with the invention, an animal control system is provided in which an AM transmission signal includes qualification criteria which upon proper decoding provides intended stimuli to an animal. The transmit signal comprises modulated pulses having a first amplitude and a second amplitude which upon decoding represent logic zero and logic one states. The receiver employs microprocessor based digital circuitry for decoding and processing of the AM transmit signal. The transmit signal is transmitted in alternating odd and even frames, each of which has particular characteristics.

The qualification protocol operates as follows. A detected signal above a predetermined threshold level is deemed a qualified signal. Upon detection of a first qualified signal during a first frame, a weak stimuli command is produced. Upon detection of a second qualified signal during a second frame immediately following the first frame, a strong stimuli command is provided. The detection routine continues for subsequent odd and even frames so long as qualified signals are detected. Thus, alternating weak and strong stimuli commands are provided to produce corresponding weak and strong stimuli to the animal. The weak stimuli are in the form of a sound of relatively low intensity and a shock of relatively low intensity. The strong stimuli are composed of a louder sound and stronger shock pulse.

In an alternative mode of operation, the stimuli can be solely auditory with no shock provided to the animal in this mode.

The gain of the received signal is tested against the threshold level by use of a variable gain amplifier, the gain of which is reduced by a predetermined amount, typically by about 8%, and comparison of the reduced gain signal with the predetermined threshold. If the reduced gain signal is above the threshold, the signal is qualified. If the signal is not at or above the threshold level, the signal is not qualified and decoding is discontinued. The reduction in the gain during the signal qualification process assures that the qualified signal is well above the threshold level for subsequent processing to occur.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
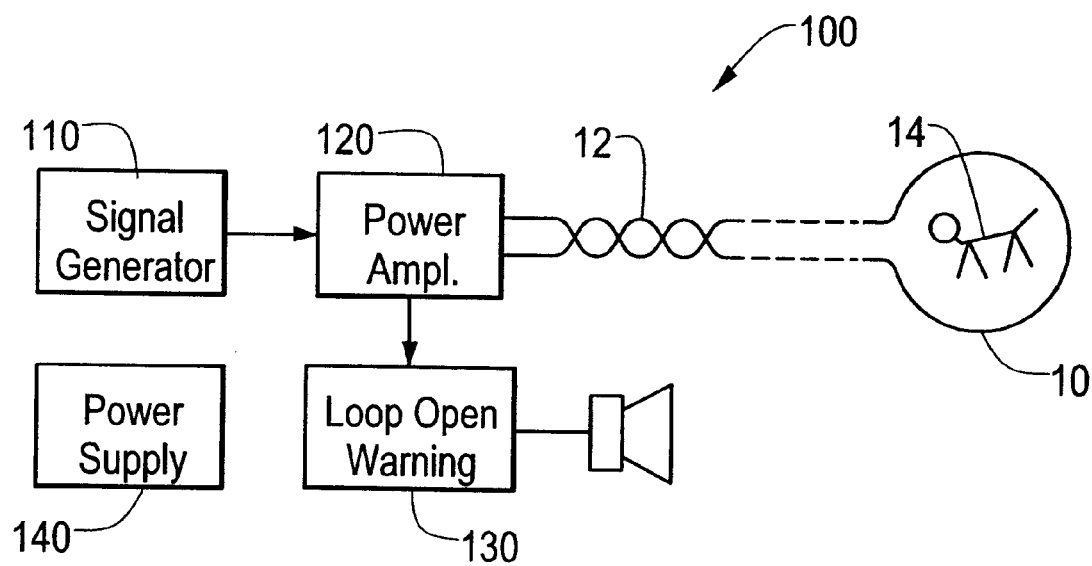
FIG. 1 is a block diagram of an animal control system incorporating the invention.
Figure 1:
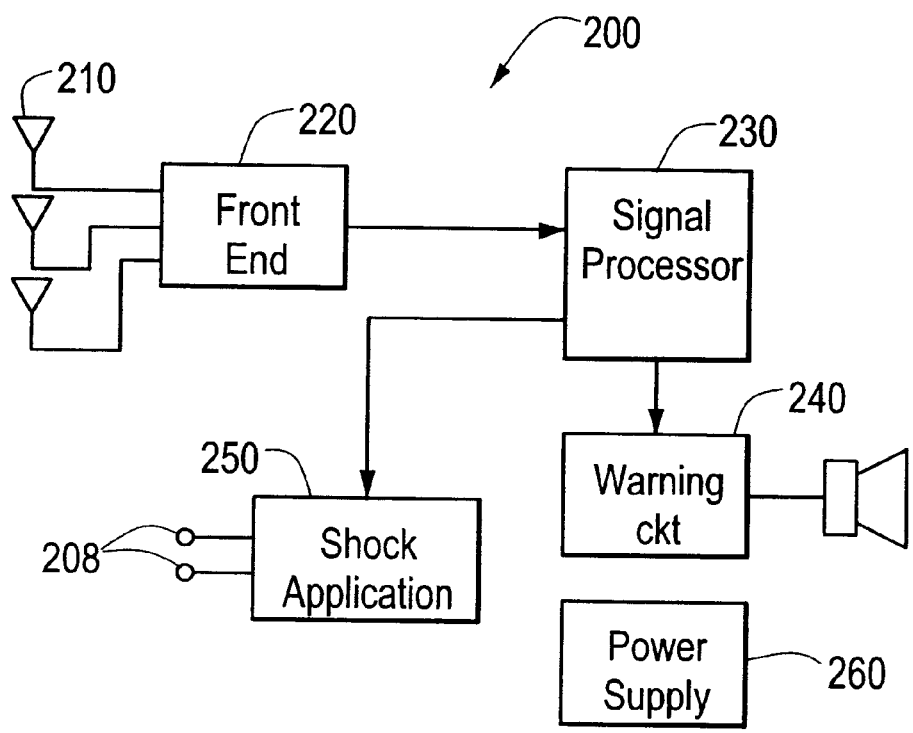

A block diagram of a system for controlling the movement of an animal, typically a dog or other family pet, is illustrated in FIG. 1. The system comprises a transmitter/control unit 100 for generating a transmit signal, a wire-loop antenna cable 10 for radiating the transmit signal, and a receiver/stimulus unit 200 for applying a stimulus to an animal 14 upon detection of a qualified transmit signal. The transmitter/control unit 100 is typically placed in a location which is sheltered and accessible to a user for programming the type and rate of the stimulus to be applied to the animal. The transmitter/control unit 100 provides an AM modulated signal which is coded with the stimulus type and rate information The antenna cable 10 is installed around the perimeter of a protected area and is typically buried approximately four inches underground. The antenna cable 10 operates as a simple magnetic field induction loop antenna and includes a twisted connecting portion 12 for connecting to the transmitter/control unit 100.

The receiver/stimulus unit 200, preferably mounted on a collar placed around the neck of an animal 14, detects the radiated transmit signal as the animal approaches the perimeter of the defined area. The animal is usually confined within the area, although the animal may alternatively be restricted from the area. The receiver/stimulus unit 200 applies a stimulus to the animal based on the stimulus information contained in the received transmit signal. The typical animal learns very quickly to stay away from the perimeter and to either remain within, or stay outside of, the defined area.

The transmitter/control unit 100 comprises a signal generator circuit 110, a power amplifier circuit 120, a loop-open warning circuit 130, and a power supply circuit 140 usually energized from a standard domestic source via an AC adapter. The receiver/stimulus unit 200 comprises an antenna assembly having three antennas 210 arranged along mutually orthogonal axes, a front-end circuit 220, a signal processor circuit 230, a warning circuit 240, a shock application circuit 250, coupled to electrodes 208 and a power supply circuit 260 which is battery powered.

Figure 2:
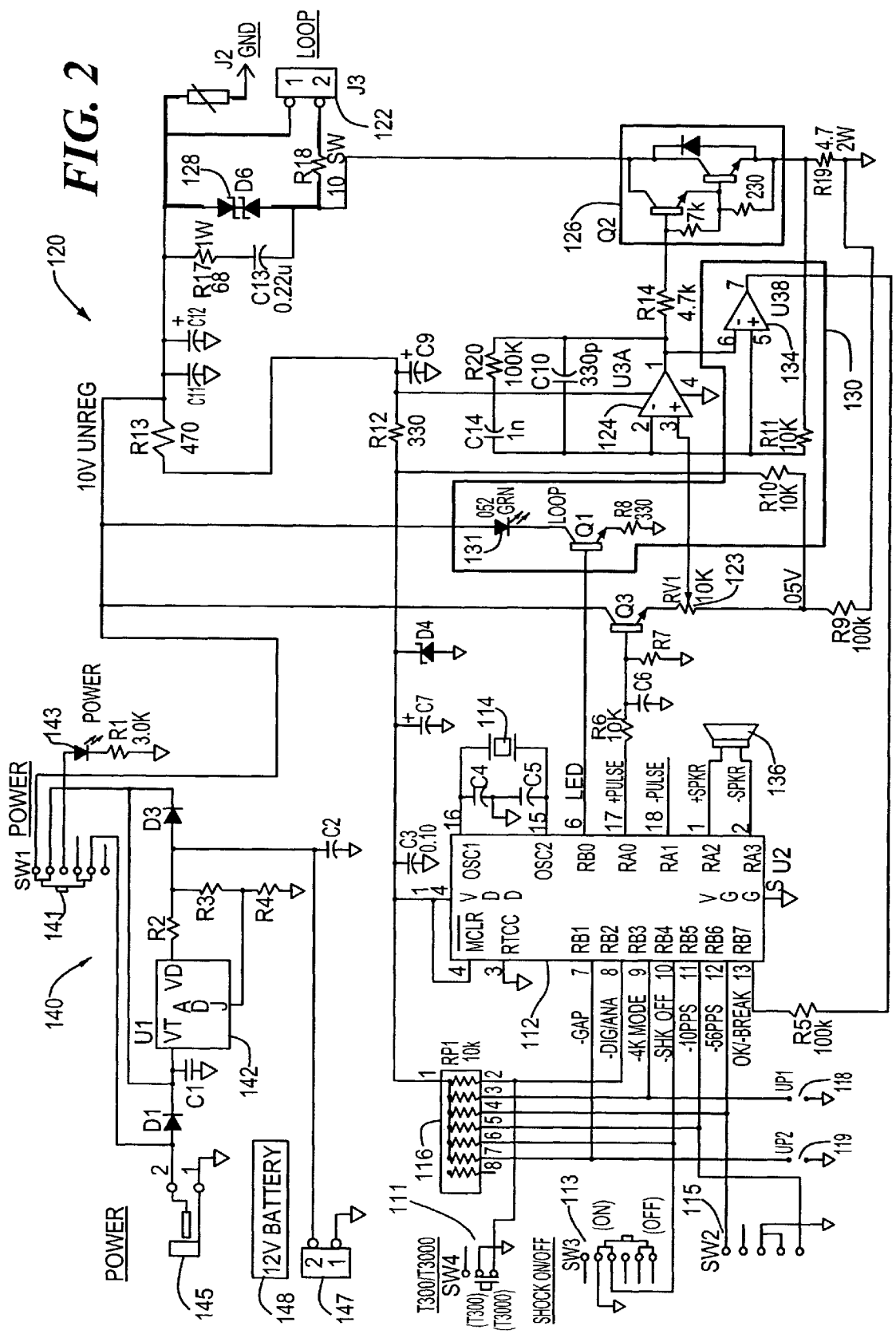
FIG. 2 is a more detailed block diagram of the transmitter/control unit of the animal control system of FIG. 1.

The transmitter/control unit is shown in greater detail in FIG. 2. The power supply circuit 140 includes a back-up battery 148, an adjustable voltage regulator circuit 142, a zener diode D4, and various current-blocking diodes, current-limiting resistors and filter capacitors as shown. Input power, typically at 18 volts, is applied to the transmitter/control unit 100 through an input power connector 145 and power switch 141. The presence of an input voltage illuminates a power indicator LED or other lamp 143. The input power is applied to the power amplifier circuit 120, and zener diode D4 steps the input voltage down to 5.1 volts to provide a power rail for the digital circuitry.

The adjustable regulator circuit 142 produces a regulated DC voltage, typically 12 volts, which is routed to a battery connector 147 to which a backup battery 148 is connected. In normal operation, the regulated DC power is used to maintain a charge on the rechargeable backup battery, such as a Powersonic PS 1242, that is connected to the battery connector 147. When a power failure is experienced, the backup battery supplies power to maintain circuit operation and thereby prevent the animal from wandering into or out of the protected area.

The signal generator circuit 110 comprises a microcontroller 112, such as the PIC16C621A microcontroller manufactured by MicroChip Technology Inc, which causes the generation of amplitude modulated pulses. The signal generator circuit 110 further comprises a quartz crystal 114, typically having a resonant frequency of 8,388,608 Hz, that is used to set the operating frequency of the microcontroller. As will be discussed below, the carrier frequency of the transmit signal and the rate of data modulated onto the carrier are related to the operating frequency. The control lines from the mode switch 111, a shock on/off switch 113 and a shock rate switch 115 are pulled up to the digital rail through separate resistors of a pull-up resistor pack 116. The system may also be set to a 4192 kHz mode, wherein the carrier frequency of the transmit signal is reduced by half, by installation of a jumper wire in a 4192 kHz mode jumper socket 118 to pull down the 4192 kHz mode control line. A spare jumper socket 119 is also provided for pull down of a control line such as for adjustment of transmit timing parameters.

The power amplifier circuit 120 includes a gain adjust transistor Q3 and a gain potentiometer 123, a low-pass buffer amplifier 124 and a feedback capacitor C10, a power Darlington amplifier 126, a current-sense resistor R19, a back to back diode surge arrestor 128, and a series load resistor R18. A power output connector 122 is connected to the antenna cable by way of a mating connector J3. The level potentiometer 123 is adjusted to achieve the desired activation distance from the loop antenna.

A loop-open detection circuit 130 includes a loop OK indicator LED 131, a transistor Q1 for driving the indicator 131, and a loop detection comparator 134. The comparator 134 monitors the output of the low-pass buffer amplifier 124, whose output will rise to the input voltage rail when and if the output current flow stops causing the voltage across the current sense resistor R19 to fall to zero. This loop-open fault condition will occur when a break occurs in the antenna cable 10 and may also occur if the power amplifier 126 fails. The output of the loop detection comparator 134 is fed to the microcontroller 112 which causes illumination the loop indicator LED 131 during normal cable operation and generates an audible warning tone, typically 4 KHz, audible through a piezo-electric speaker 136, if an open cable condition is detected. It is essential that the user be warned of an loop-open fault condition because of the risk of the animal wandering away from (or into) the protected area.

Figure 3:
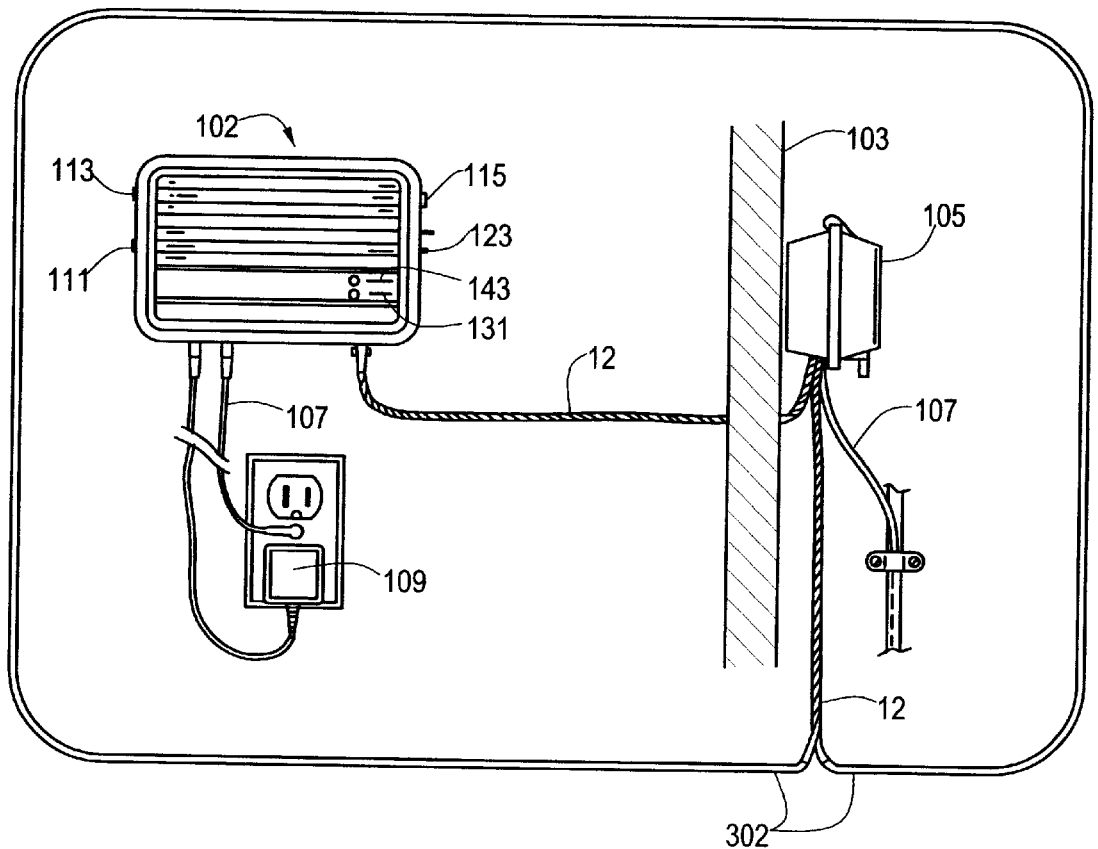
FIG. 3 is an illustration of a transmitter/control unit in a typical installation.

Referring to FIG. 3 the transmitter circuitry is included within a small enclosure 102 which is coupled to the loop antenna via a twisted wire interconnection 12. The transmitter housing is typically mounted on a wall in a garage or other inside location protected from the outside environment. The twisted wire is fed through an outside wall 103 to a surge protector 105 which protects the transmitter from electrical surges due to lightning and other causes. The surge protector and transmitter are grounded by a grounding wire 107. The transmitter is powered from a low voltage adapter 109 which is in turn powered from a standard 120 volt outlet. The transmitter enclosure includes a power on-off switch 113, a shock rate selector switch 115, a stimulus selector switch 111 and a gain or range adjustment control 123. The enclosure also includes a power indicator light 143 and a loop indicator light 131.

The rate selector switch 115 selects a slow, medium or fast shock rate. The selector switch 111 selects the stimulus mode, such as audible only or audible plus shock. The range control 123 provides adjustment of the antenna field strength to increase or decrease the effective width of the avoidance zone. The power indicator light 143 is illuminated when the transmitter is connected to a power source and the on-off switch is on. The loop indicator light 131 is illuminated if electrical continuity is maintained in the loop antenna. If electrical continuity is lost or if the signal is otherwise interrupted the loop indicator is extinguished and an audible alarm is sounded to warn of the loss of signal.

Figure 4A:
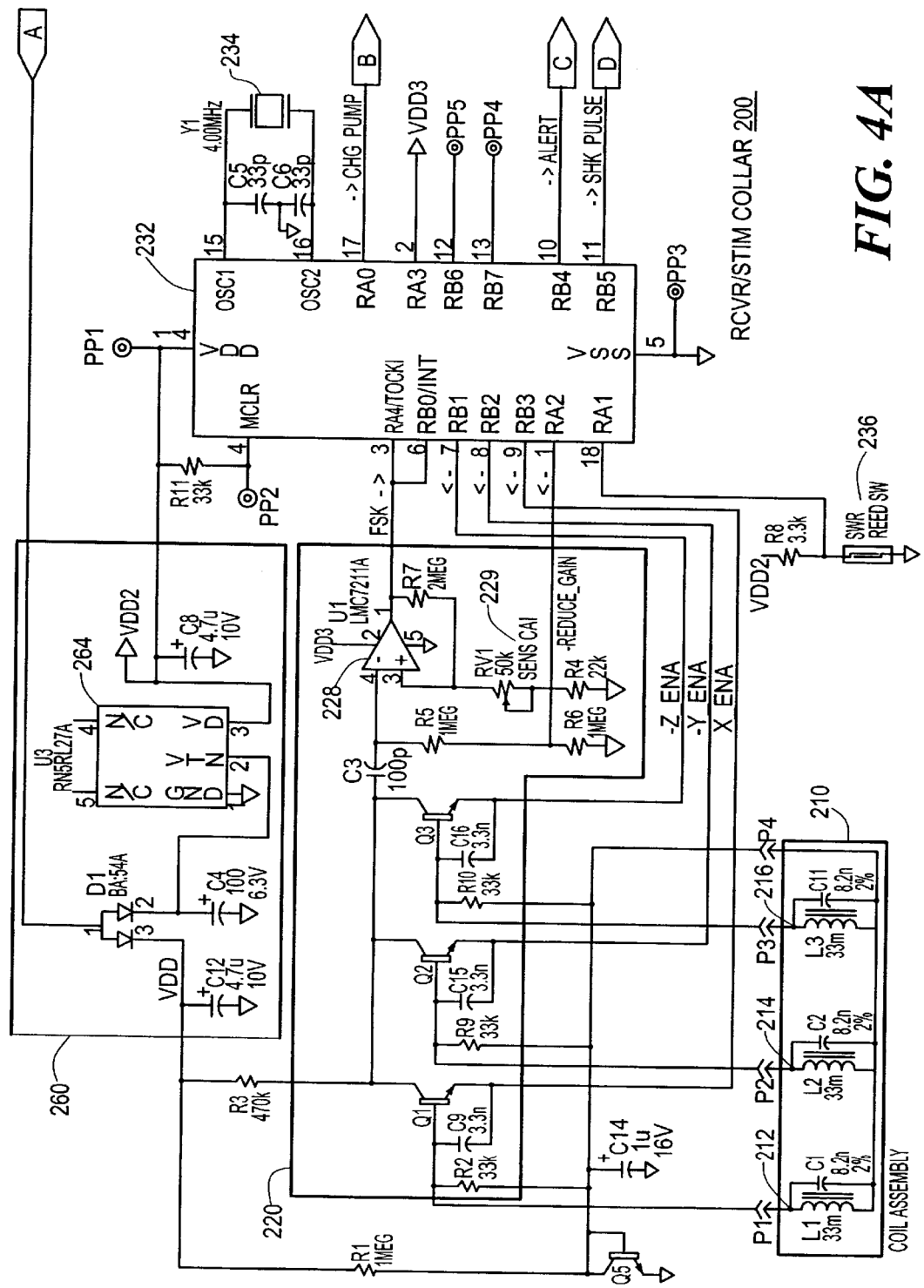
FIGS. 4A–4B are detailed block diagrams of the receiver/stimulus unit of the animal control system of FIG. 1.
Figure 4B:
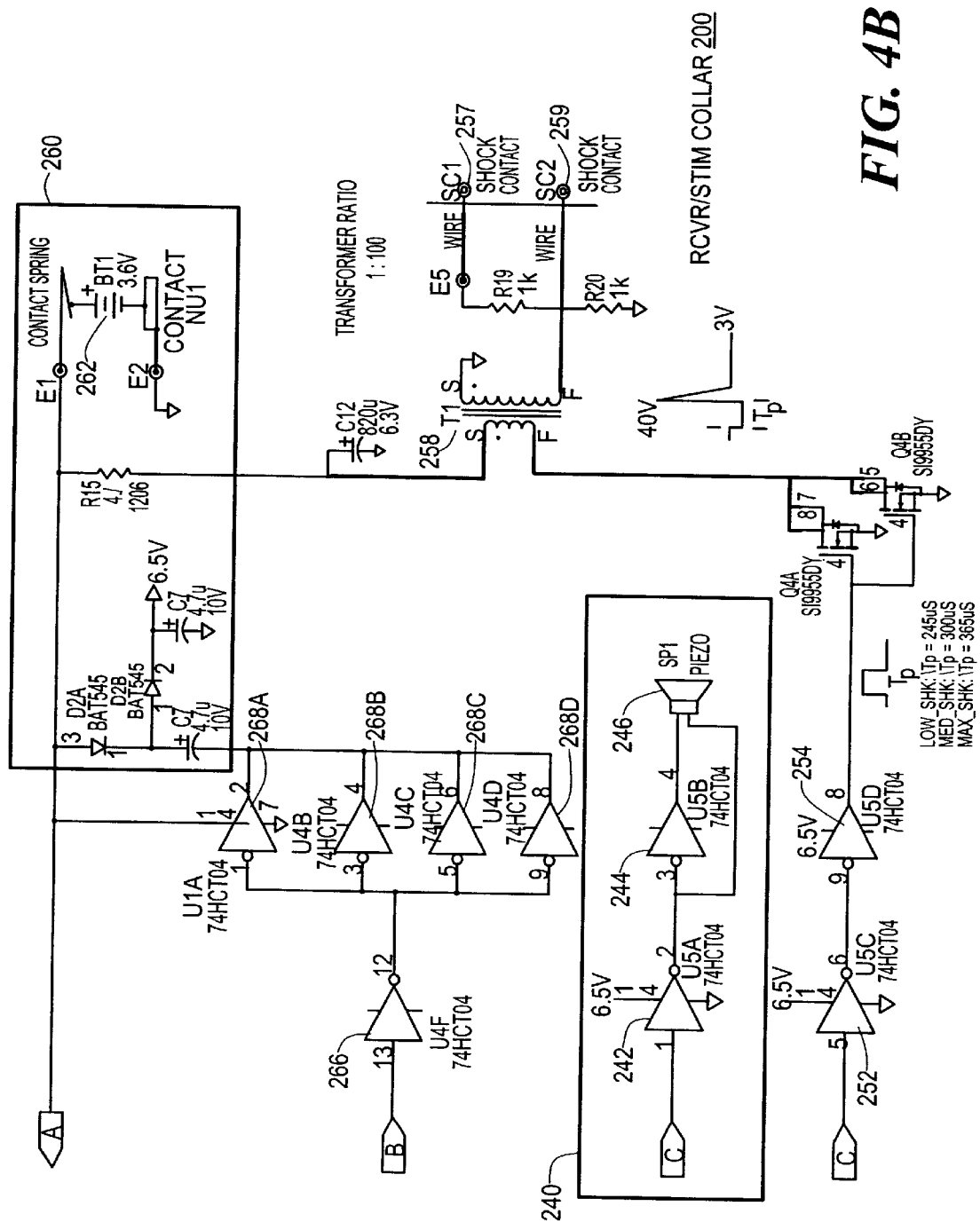

The receiver/stimulus unit is shown in greater detail in FIGS. 4A and 4B. The power supply circuit 260 comprises a replaceable 3.6 volt battery 262, a 2.7 volt regulator 264, and various current-blocking diodes, current-limiting resistors and filter capacitors as shown. A charge pump circuit comprising a driver inverter 266 and a bank of parallel-connected inverters 268A–268D is used to raise the level of the voltage supplied to the warning circuit 240 and shock application circuit 250 to approximately 6.5 volts. The charge pump is driven by a charge pump control signal generated by the microcontroller 232. During non-stimulus periods, the change pump control signal is pulsed each time the receiver wakes up from a sleep mode. During a stimulus period, the charge pump control signal is pulsed at the stimulus application rate.

The front-end circuit 220 includes separate gain transistors Q1, Q2 and Q3 for the received X-direction, Y-direction and Z-direction signals, 212, 214, 216 respectively, to provide circuit redundancy so that the system still operates in at least one direction if one or two of the gain transistors fail. The gain transistors are sequentially enabled so that at any one time only a single received signal is present at the input of a comparator amplifier 228. The microcontroller 232 can adjust the level of the input signal via a gain reduction control signal. When the gain reduction control signal is brought to ground, the level of the input signal is reduced, typically by 8%. A calibration potentiometer 229 is used at the time of manufacture to adjust the sensitivity of the comparator amplifier 228.

The signal processing circuit 230 (FIG. 1) comprises a microcontroller 232, such as a PIC16LF84 microcontroller manufactured by MicroChip Technology Inc. The microcontroller 232 executes a below-described routine to detect and decode the received signal. The signal processor circuit 230 further comprises a frequency control element, which preferably is a ceramic resonator 234, typically having a resonant frequency of 4 MHz, that is used to set the operating frequency of the microcontroller. The resonator has a low Q to achieve a fast start up. A switch 236 such as a reed switch is used to perform local programming, such as shock level, transmitter mode and operating frequency. The reed switch is activated by a magnetic probe placed in proximity to the switch to activate it. The microcontroller 232 also generates the X-direction enable, Y-direction enable, Z-direction enable and reduce gain control signals.

The warning circuit 240 comprises a series-connected pair of inverter buffer/driver amplifiers 242, 244 and a piezoelectric speaker 246 for generating an audible tone from an alert signal produced by the microcontroller 232. In this embodiment, an audible tone is always generated when the FSK transmit signal is detected.

The shock application circuit 250 comprises a series-connected pair of inverter buffer/driver amplifiers 252, 254, a parallel-connected pair of mosfet power transistor switches Q4A and Q4B, a transformer 258, and first and second electrodes 257, 259. The transformer preferably has a primary-to-secondary winding turns ratio of 1 to 100. When a electrical stimulus is enabled, the power transistor switches are turned on for a predetermined time period, such as 245 microseconds for low shock, 300 microseconds for medium shock and 365 microseconds for high shock. The current flow through the primary winding of transformer 258 induces a current pulse in the secondary winding. The current in the secondary winding flows out of the second electrode 259, through the skin of the animal, and back into the first electrode 257. Shock pulses are applied at either a low 10 pulse-per-second (PPS), medium 32 PPS or high 58 PPS rate. Frequency control is sufficiently precise to achieve 1 microsecond resolution to precisely control the pulse width and thus the shock voltage applied to the animal.

If the pet remains or lingers in the activation zone for a predetermined period of time, typically 10 seconds, the shock stimulus is stopped and then restarted if the pet is still in the activation zone.

Figure 5:
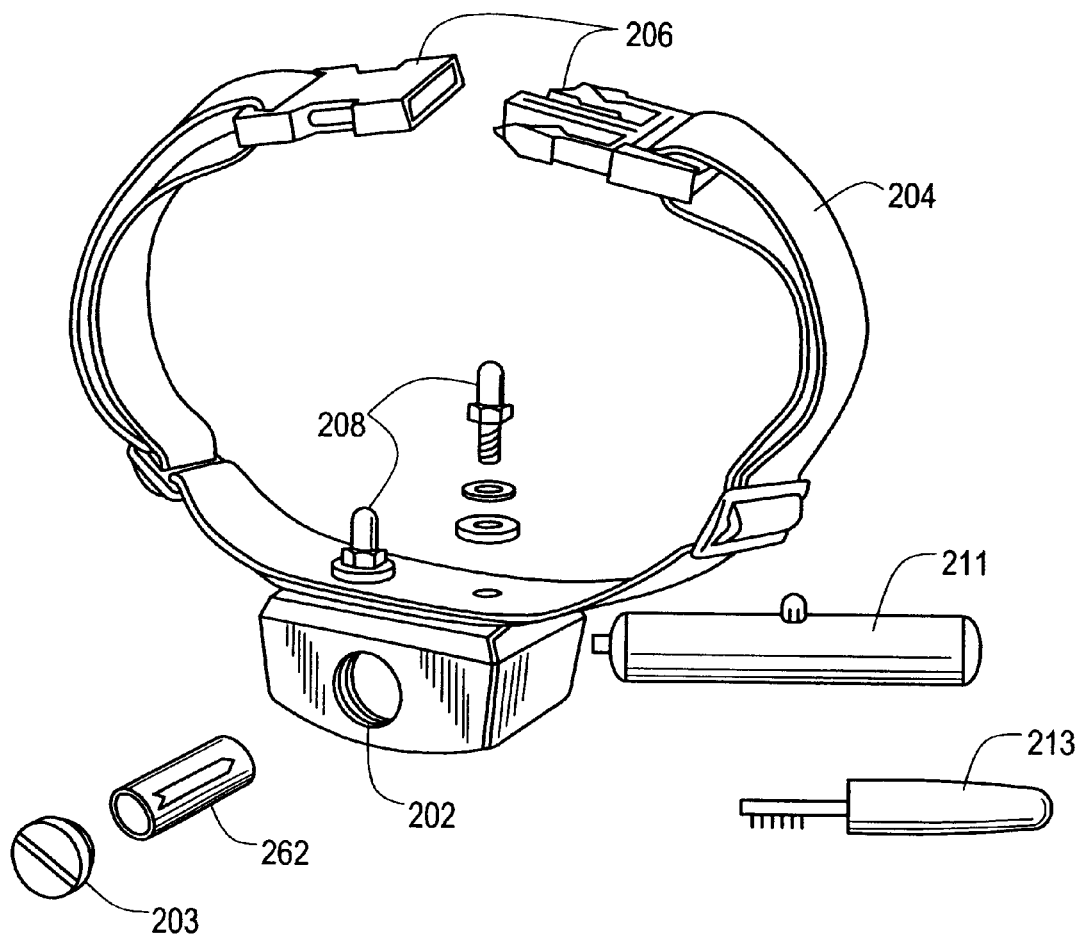
FIG. 5 is a pictorial illustration of the receiver/stimulus unit affixed to a dog collar.
Figure 6A:
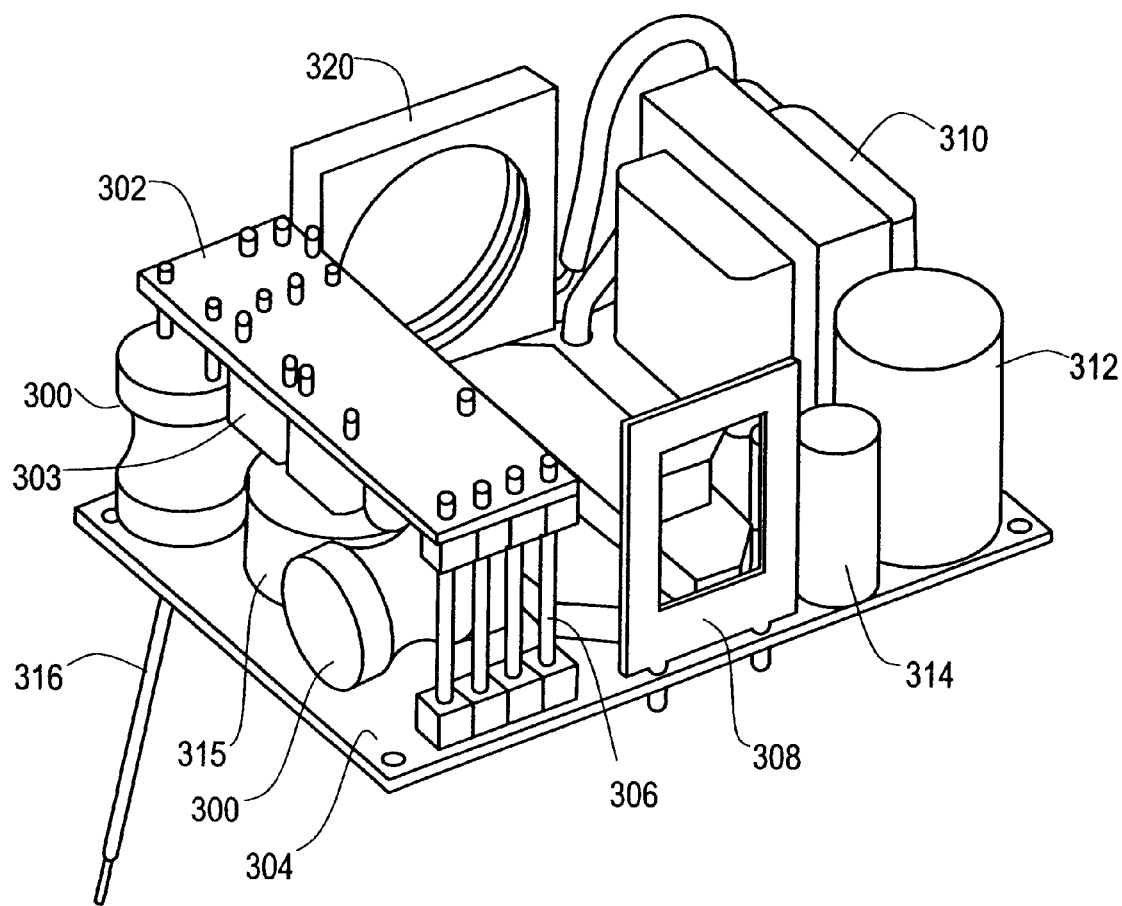
FIGS. 6A–6C are perspective views of the internal circuitry of the receiver/stimulus unit of FIG. 5.
Figure 6B:
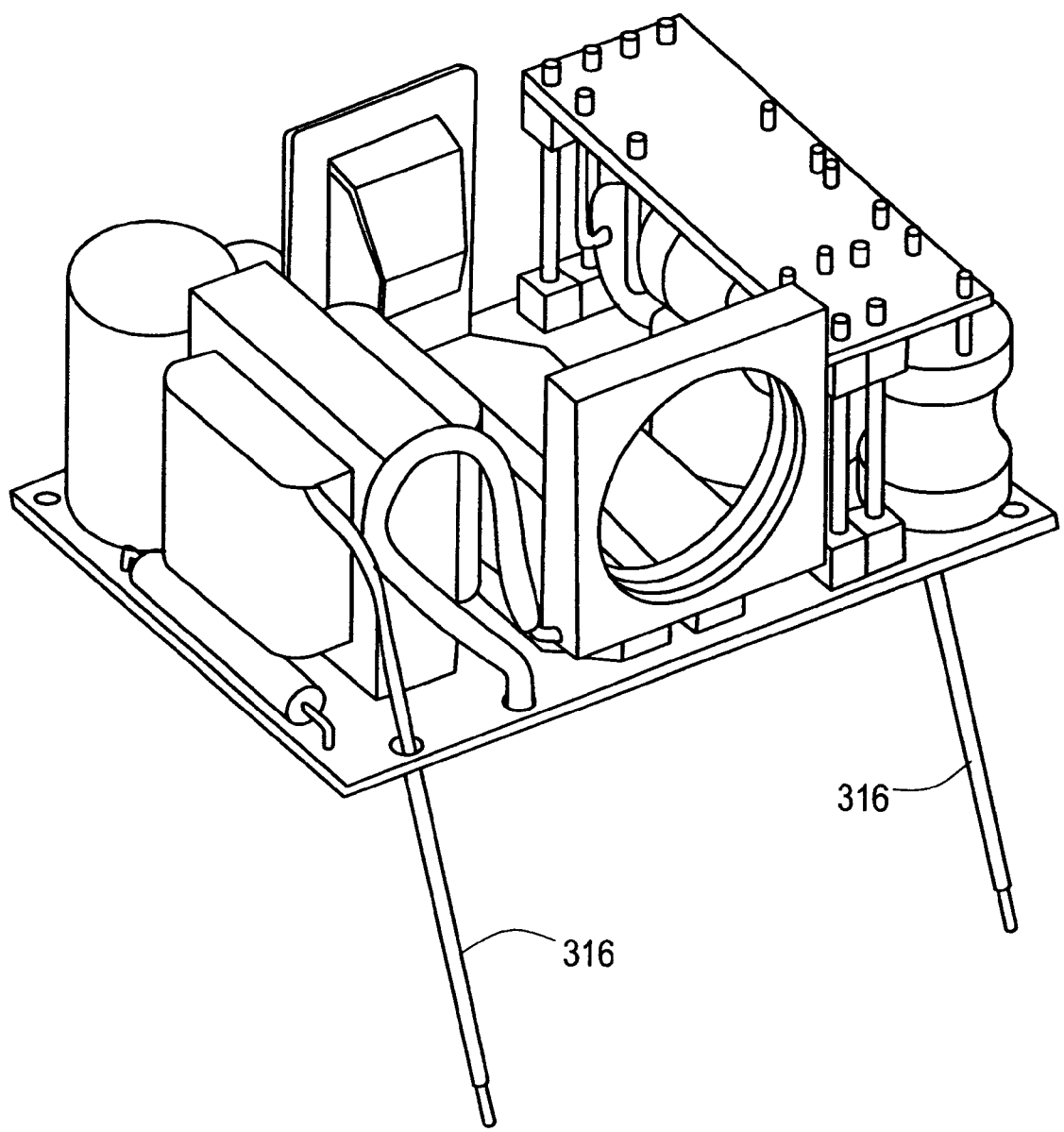
Figure 6C:
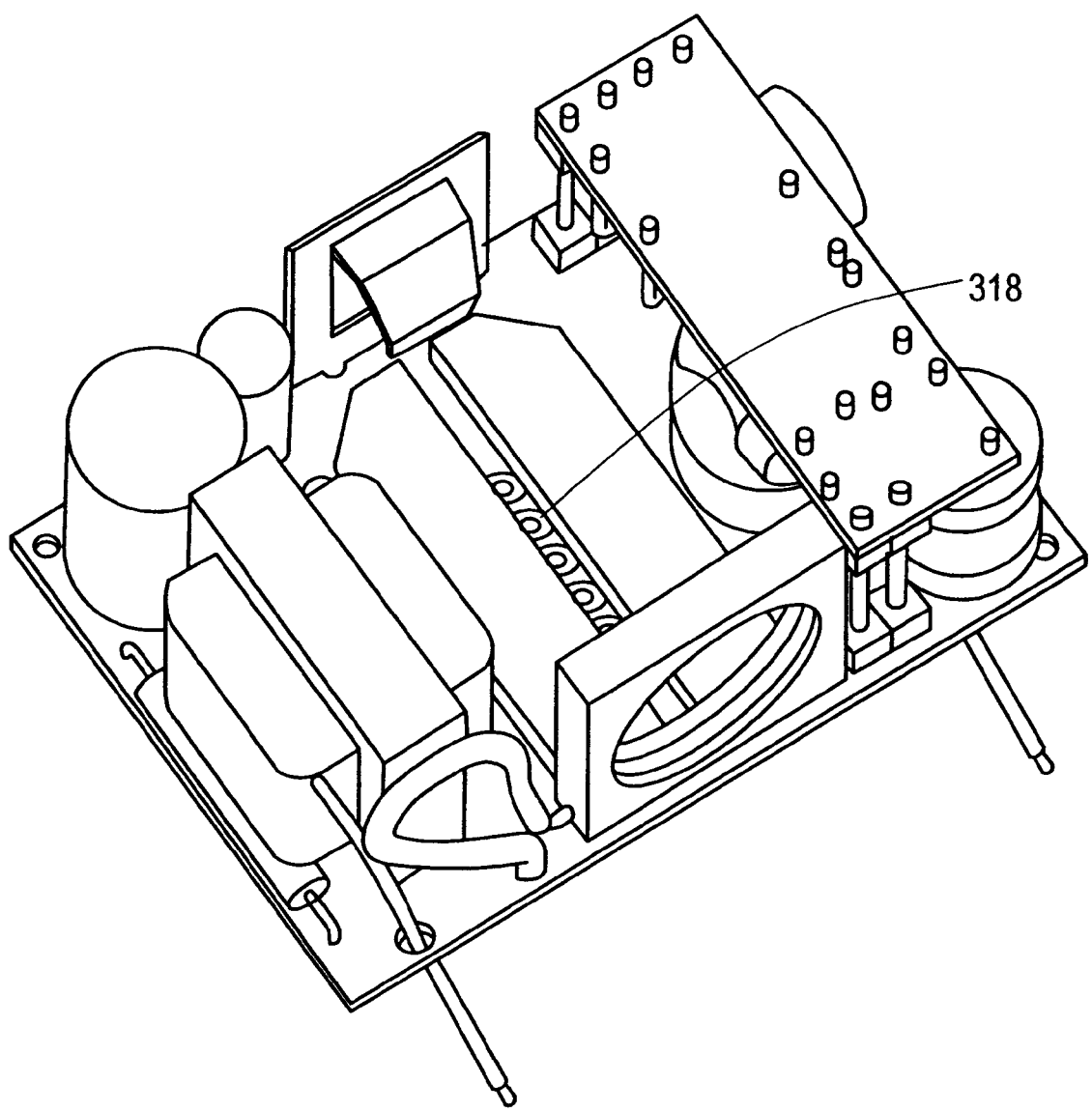
Figure 6D:
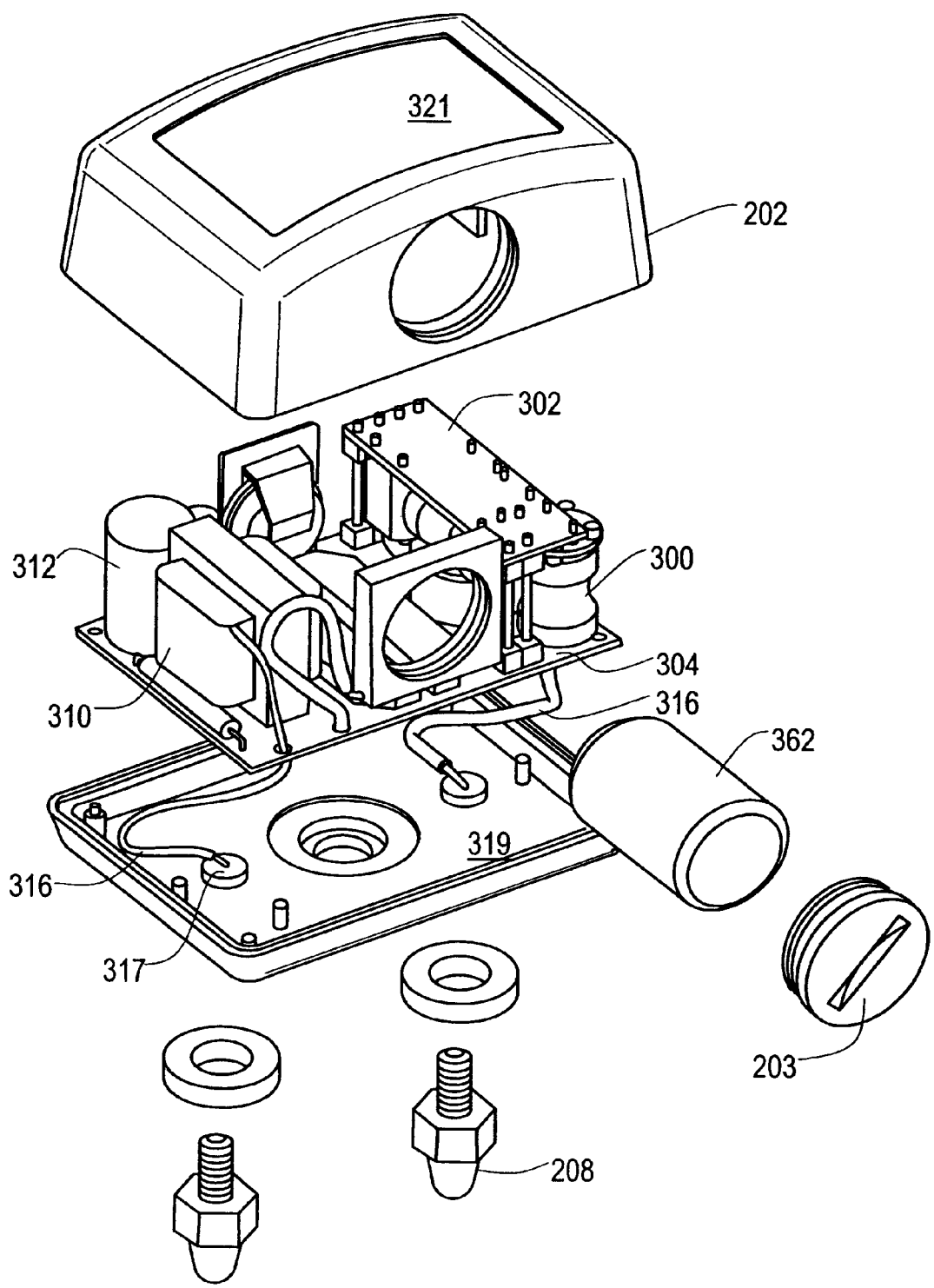
FIG. 6D is an exploded pictorial view of the receiver/stimulus unit.

The receiver/stimulus circuitry is housed as shown in FIG. 5. A waterproof enclosure or case 202 is affixed to a length-adjustable strap 204 having a clasp or buckle 206 to facilitate removable mounting of the unit 200 around the neck of the animal. The electrodes 208 protrude from the enclosure 202 and are operative to press against the animal's skin for application of the electrical shock. The electrodes 208 also serve as a mechanical means for affixing the enclosure 202 to the strap 204 by way of threaded ends and washers as shown. A replaceable battery 262 is held within the enclosure 202 by a retaining cap 203. Programming can be accomplished with a magnetic probe 211 which activates the reed switch 236, as discussed above. A multi-pin probe 213 is employed with the test socket for programming of the microprocessor memory.

The receiver circuitry is packaged as shown in FIGS. 6A–6D. The antenna coils 300 are mounted on a circuit board 302 on which is also mounted associated capacitors 303. This circuit board 302 with the mounted antenna coils and capacitors forms an antenna subassembly which is connected to circuit board 304 by connectors 306. The receiver circuitry is mounted on circuit board 304 which also contains a battery mount 308, transformer 310 which provides the shock voltage, energy capacitor 312 and decoupling capacitor 314 and speaker 315. The output leads 316 are connected to output terminals 317 on the receiver case which in turn are connected to electrodes 208 for providing the shock to the animal. The circuit board 304 also contains a plurality of sockets 318 which are accessible to a multi-pin probe 203 (FIG. 5) which can be inserted through the battery opening in the case via battery fitting 320 and plugged into the sockets 318 to provide a connection for programming or reprogramming of the memory.

The case 202 has a bottom 319 and a top 321 which contain the circuitry and which are bonded together to form a waterproof enclosure which is unaffected by rain, dirt and other contaminants when in use on an animal.

Figure 7:
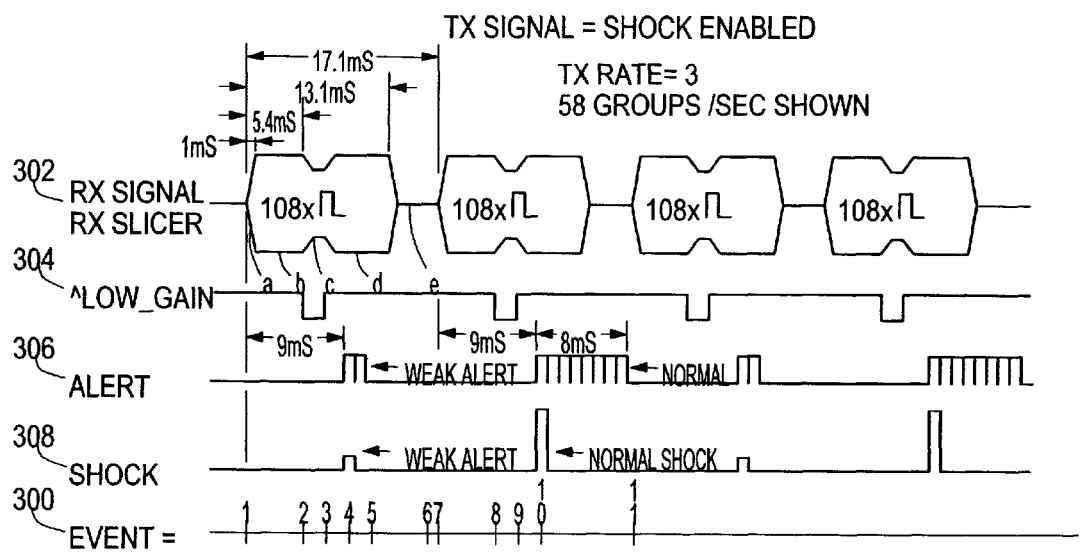
FIG. 7 is a waveform and timing diagram.
Figure 7:
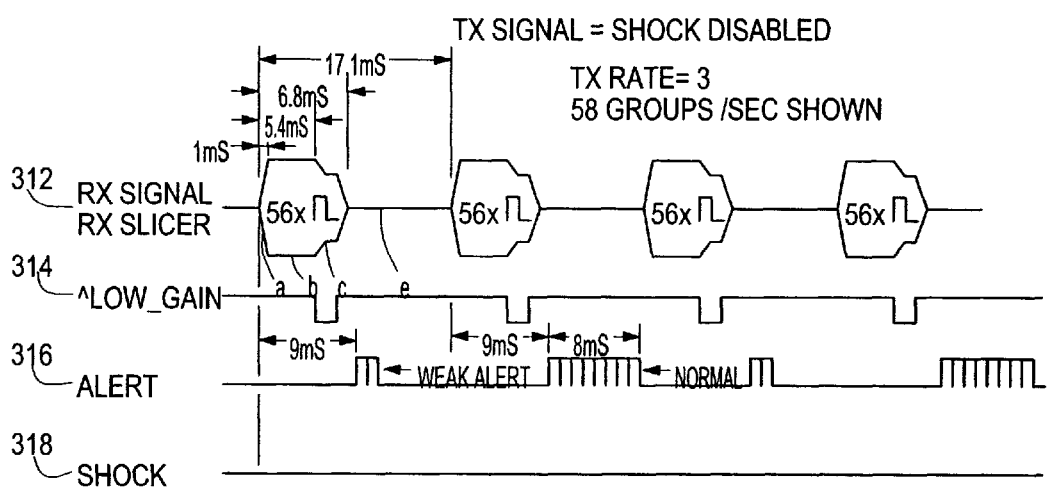

The signal transmitted by the transmitter/control unit comprises a small DC supervision current with an on/off keyed signal component. The signal typically has a carrier frequency of 8.125 kHz. The DC supervision current is representative of logic zero, while the predetermined bursts of 8.125 kHz are representative of logic one. These logic states are employed for digital processing of the decoded signal. The signaling format is shown in the signal and timing diagram of FIG. 7 which depicts the signals as received and processed. The signal format in the upper portion of FIG. 7 is provided when the shock enabled condition is selected at the transmitter/control unit. When the transmitter/control unit is set to the shocked disabled condition, the signal format is as provided in the lower portion of FIG. 7. The transmit signal frames are composed of odd and even frames.

Figure 8:
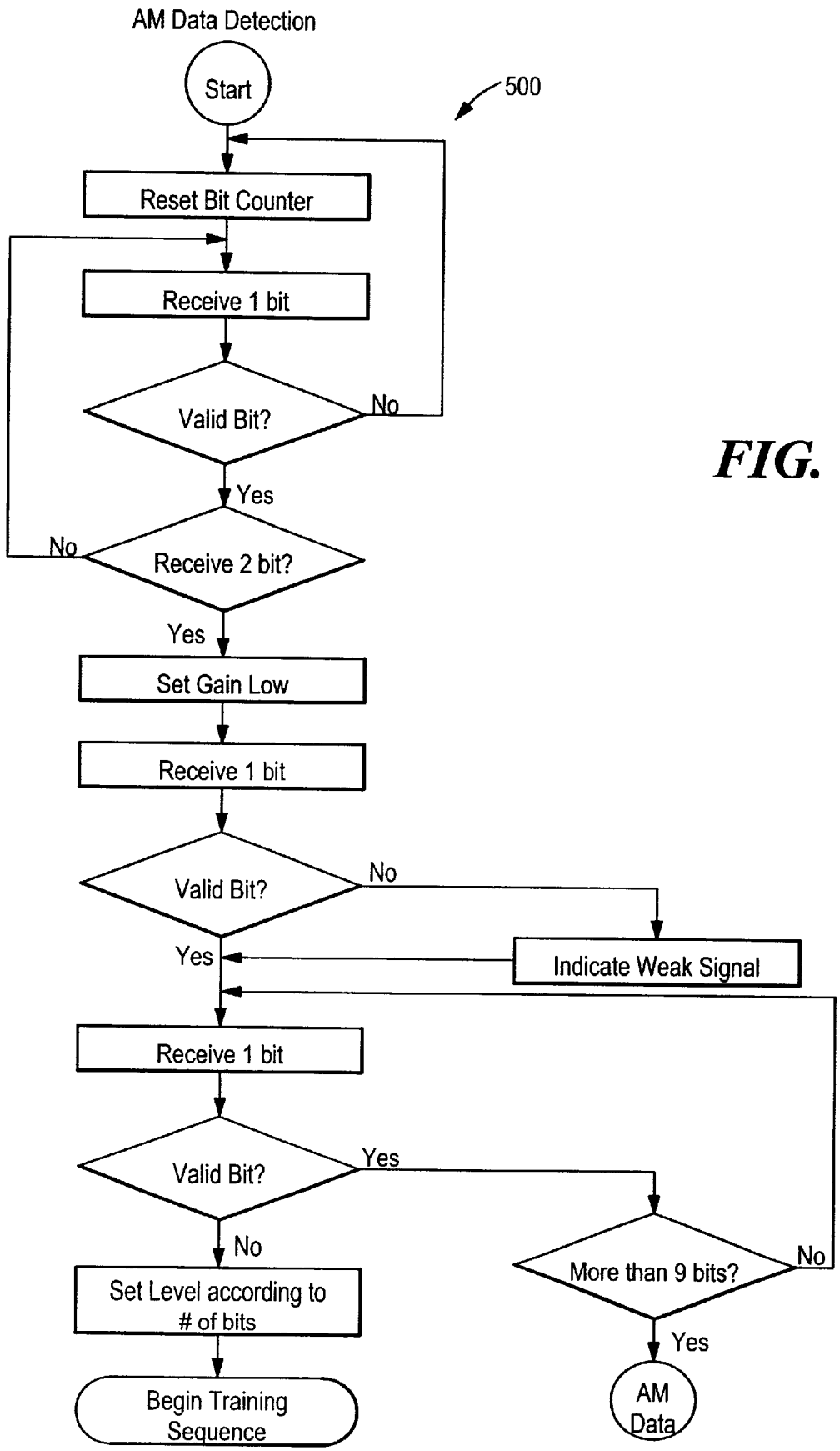
FIG. 8 is a flow chart of the decoding procedure executed by the signal processor of the receiver/stimulus unit.

The signal characteristics will be described in relation to the time intervals defined by the events shown in FIG. 7. A flow chart of the decoding sequence 500 is shown in FIG. 8. For the shock enabled condition, a warning period is defined by a 1 ms rise portion a, a 4.4 ms full power portion b and a 1.4 ms reduced gain portion c.

When the signal processor 232 detects a signal between events 1 and 2, the gain of the variable gain amplifier 228 is reduced, typically by about 8%, between events 2 and 3. If the reduced gain signal is above a predetermined threshold, the received signal is designated as "strong". The gain of the variable gain amplifier 228 is returned to the normal gain level at the end of event 3. If a strong signal is detected between events 3 and 4, the signal processor 232 provides a weak alert and weak shock command for corresponding weak stimuli to the animal. The stimuli are usually in the form of a weak audible alert and a weak electrical shock applied to the animal between events 4 and 5. The absence of a detected signal between events 5 and 6 is recognized as the end of a frame.

If the received signal was not qualified in the frame immediately preceding the present frame, the present frame is identified as the first odd frame for weak stimuli to be provided. The period between event 6 and 7 is used for processing time.

During the next signal frame, which is the first even frame after a qualified odd frame, the signal is detected between events 7 and 8, and the signal gain is reduced during events 8 and 9. The gain is restored to the full level between events 9 and 10. If the received signal, during events 8 and 9, is above the predetermined threshold, the received signal is again designated as "strong". If the strong signal is detected between events 9 and 10 and if the preceding frame was qualified as the first odd frame, this present frame is recognized as the first even frame and a normal strength audible alert and normal strength electrical shock are applied to the animal between events 10 and 11.

The frame occurring immediately after the first even frame is identified as the second odd frame and the procedure for detection and decoding is as described above with respect to events 1–7. The alternating application of a weak alert/shock and a strong alert/shock will continue if the strength of the received signal remains above the predetermined threshold. If the received signal falls below the predetermined threshold and thus fails to qualify as a strong signal during any subsequent frame, the signal must be re-qualified for stimuli to occur.

When the shock disabled condition is selected at the transmitter, only an audible warning is given to the animal. The signaling frame is comprised of a warning period during events 1 and 3 and a quiet period during events 4 and 7. If the signal between events 2 and 3 and events 8 and 9 is above the predetermined threshold, the signal processor 232 provides a weak warning command for providing a weak audible warning to the animal between events 4 and 5. A normal warning is given between events 10 and 11.

Figure 9:
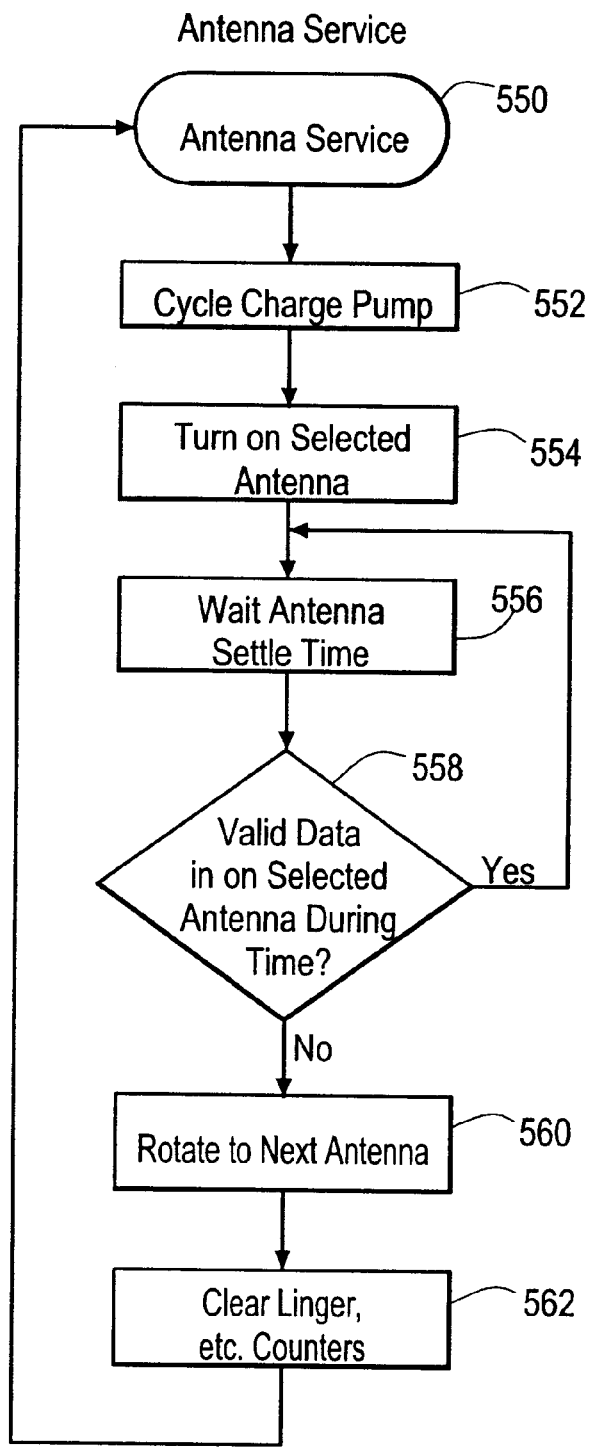
FIG. 9 is a flow chart of the antenna selection procedure of the receiver/stimulus unit.

The procedure by which the X-direction, Y-direction or Z-direction antenna is selected is shown in FIG. 9. When an antenna is to be selected (550), the charge pump is ordered to be cycled (552), the selected antenna circuit is turned on and all other antenna circuits turned off (554). The settle time provides a delay sufficient for signal acquisition (556). If a valid data bit is received during the delay, the settle time is reset and the delay begun again (556). If the test for valid data (558) fails, the next antenna is selected (560), the linger time is reset (562) and the antenna service 550 is begun again.

Figure 10:
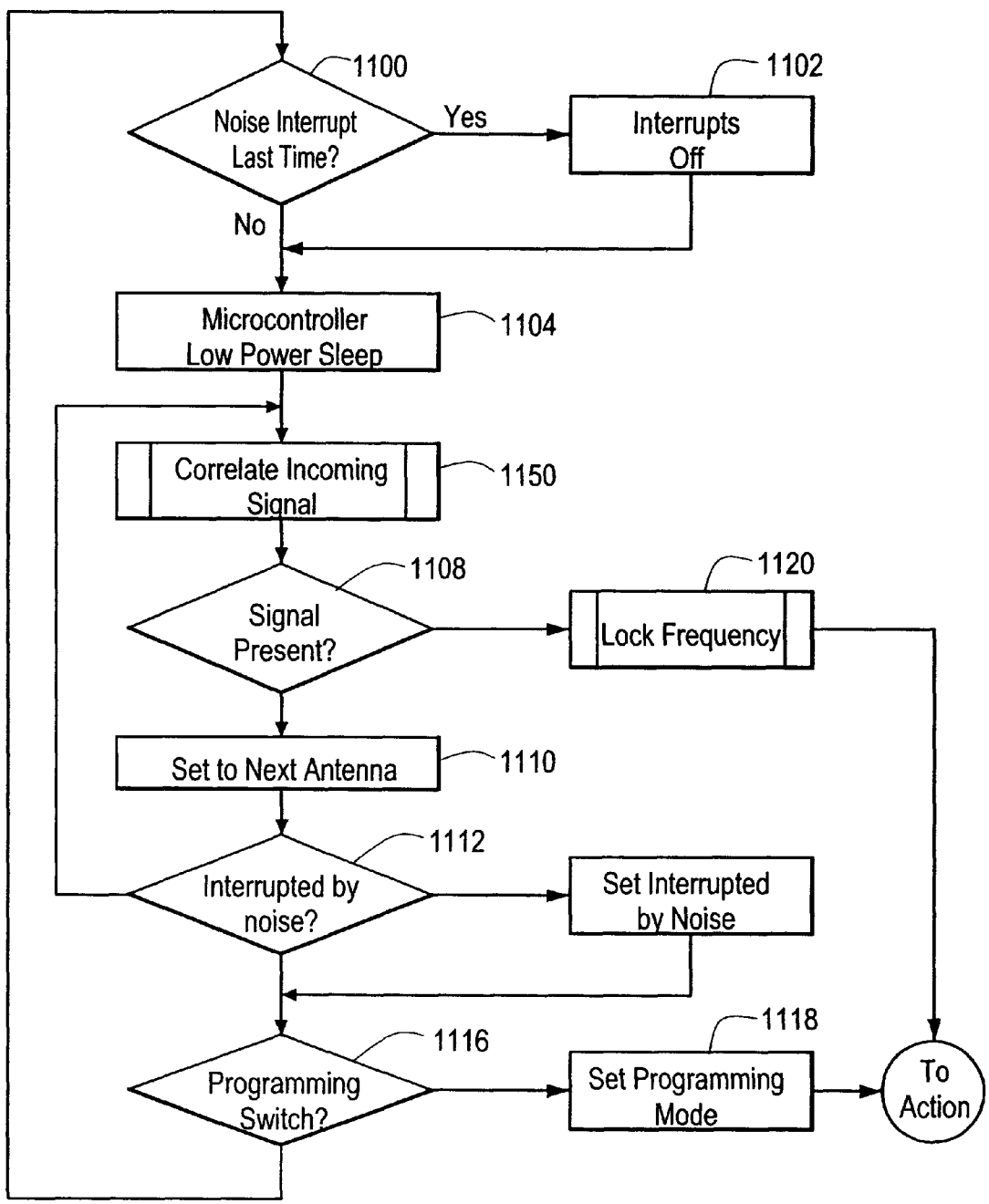
FIG. 10 is a flow chart of the sleep/wake procedure executed by the receiver/stimulus unit.

The sleep/wake operation is shown in the flowchart of FIG. 10. In order to conserve battery life, the microcontroller is maintained in a sleep state and awakens at periodic intervals or upon an interrupt which may be occasioned by a valid signal being received. The sleep time in the illustrated embodiment is 110 ms. After a valid signal is received the microcontroller enters a sleep mode and will be awakened during the sleep period upon detection of another valid signal or noise. Upon detection of a noise signal the microcontroller will return to a sleep mode for the full sleep period of 110 ms. Thus in the presence of a noisy environment, the microcontroller will enter a sleep mode for the full sleep period and will only reawaken after the sleep period to await receipt of a possible signal. If that signal is a noise signal, the microcontroller will again return to the sleep mode for the full sleep period. If a valid signal is detected the next sleep mode will not necessarily extend for the full sleep period but will end upon detection of the next signal which may be either a valid signal or noise. Whether or not the sleep mode occurs for the full period is determined by the presence of interrupts. If noise was most recently received, the interrupts are switched off (1102) so that the sleep mode occurs for the full sleep period (1104). After the sleep mode the microcontroller detects an incoming signal (1150) and if a valid signal is present (108) the signal frequency is locked (1120) and after the detection cycle as described above appropriate output signals are provided. Any noise interruption (1112) of the detection process will cause return to the sleep cycle routine (100). During each detection cycle the programming switch is examined (1116) to determine whether any mode changes have been made and if so the appropriate programming mode is set (1118).

Figure 11:
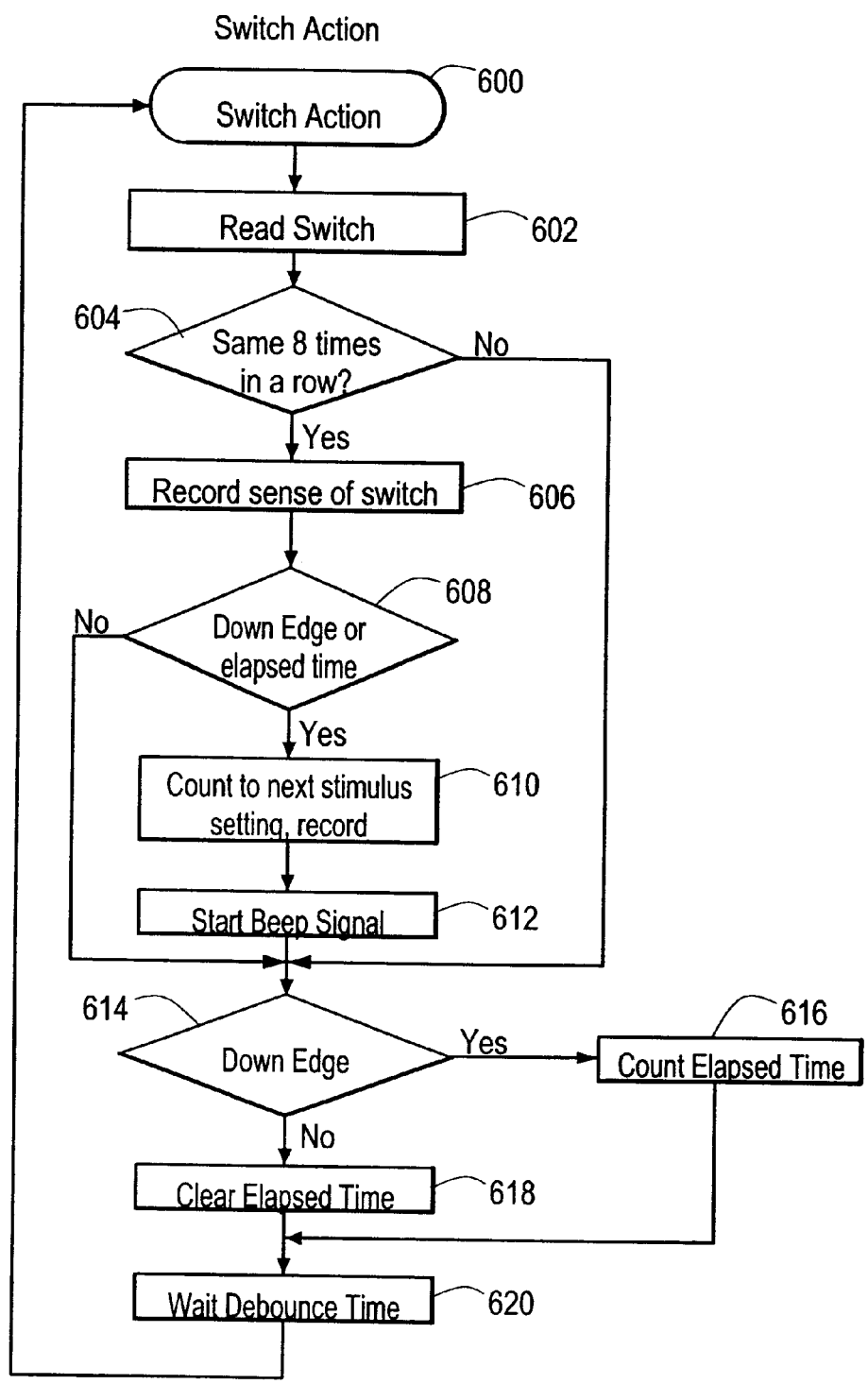
FIG. 11 is a flow chart of the switch validation procedure of the receiver/stimulus unit.

The method for validating switch entry (600) and the actions to be taken are shown in FIG. 11. First, the physical switch value is read (602) and compared with previous readings. If the readings are the same 8 times in a row (604) the sense of the switch is recorded (606). If a down edge has occurred or the switch dwell time has been exceeded (608), then the next stimulus level is selected with reset to the first level if the last level has been, exceeded and the stimulus level is recorded in a non-volatile memory (610). An audible beep signal is started (612). If the switch remains in a depressed or down state (614), elapsed time for the switch dwell is counted (616). If the switch is in an undepressed state, the switch dwell time is set to 0 (618). A predetermined wait is executed (620) before beginning the cycle again (600).

Having described preferred embodiments of the present invention it should be apparent to those of ordinary skill in the art that other embodiments and variations of the presently disclosed embodiment incorporating these concepts may be implemented without departing from the inventive concepts herein disclosed. Accordingly, the invention should not be viewed as limited to the described embodiments but rather should encompass the full scope and spirit of the appended claims.

What is claimed is:

1. A system for controlling the movement of an animal, comprising:
    a transmitter for providing modulated pulses of first and second amplitude levels and coded with stimulus type and rate information;
    a loop antenna for defining a protected area in which an animal is to be contained; and
    a receiver/stimulus unit mounted on the animal and operative to digitally decode the received signal to provide successive weak and strong stimuli of the same type to the animal.

2. The system of claim 1 wherein the receiver/stimulus unit includes a microcontroller based decoder operative to detect odd and even frames of received signals from the transmitter and antenna;
    and wherein the decoder is operative to compare during each frame the received signal with a predetermined threshold and to decode the received signals which are above the threshold.

3. The system of claim 2 wherein the receiver/stimulus unit includes a variable gain amplifier operative to reduce the gain of the received signal during each frame by a specified amount prior to comparison of the received signal with the predetermined threshold.

4. The system of claim 1 wherein said receiver/stimulus unit includes a collar removably mounted on and in contact with said animal.

5. The system of claim 1 wherein said stimuli comprise an audible alarm.

6. The system of claim 1 wherein said stimuli comprise an electrical shock.

7. The system of claim 1 wherein said antenna comprises a loop of cable.

8. The system of claim 1 wherein said animal is contained within said area defined by said antenna.

9. The system of claim 1 wherein said animal is restricted from said area defined by said antenna.

10. The system of claim 1 wherein the receiver/stimulus unit includes an antenna assembly having three antennas arranged along mutually orthogonal axes.

11. The system of claim 1 wherein said receiver/stimulus unit further comprises a plurality of gain transistors, a respective gain transistor of said plurality of gain transistors in electrical communication with a respective antenna of said plurality of antennas.

12. The system of claim 1, wherein the receiver/stimulus unit is battery powered, having a sleep mode to conserve power.

13. The system of claim 1 wherein the receiver/stimulus unit includes a programmable memory for programming of intended system parameters.

14. The system of claim 11 wherein the receiver/stimulus unit further includes a front end circuit coupled to the antenna assembly, a signal processor circuit, a warning circuit, a shock application circuit and electrodes which are attachable to the skin of an animal.

15. The system of claim 14 wherein the front end circuit of the receiver/stimulus unit includes a plurality of gain transistors each associated with a respective one of the plurality of antennas, and circuitry for sequential enabling of the gain transistors.

16. A system for controlling the movement of an animal comprising:
- a transmitter/control unit for generating amplitude modulated pulses containing encoded data;
- an antenna coupled to the transmitter/control unit for radiating the modulated signal in a defined area; and
- a receiver/stimulus unit for receiving the energy from the antenna and for decoding the received signal to provide alternating weak and strong stimuli of the same type to the animal upon qualification of the decoded signal.

17. A method for controlling the movement of an animal in which energy radiated in a defined area is detected by a receiver worn by the animal, the receiver being operative to select a stimulus type and provide the selected stimulus to the animal upon a valid detection of predetermined characteristics in a received signal, the method comprising:

a. detecting a received signal of at least a first duration and amplitude above a predetermined threshold;

b. measuring the amplitude of the received signal after a second duration;

c. providing in response to the measurement of step b selected stimuli of a first magnitude;

d. detecting a received signal of at least the first duration and amplitude above a predetermined threshold within a predetermined time-period following the measurement of step b;

e. measuring the amplitude of the received signal detected in step d after a second duration;

f. providing in response to the measurement of step e selected stimuli of the same type as step c of a second magnitude;

g. repeating steps a through f for so long as the detection of steps a and d continue.

18. A system for controlling the movement of an animal comprising:
- a transmitter for providing a signal having a DC component representing a first logic level and pulses alternately keyed on and off representing a second logic level;
- a loop antenna for defining a protected area in which an animal is to be contained;
- a receiver/stimulus unit mounted on the animal and operative to digitally decode the received signal to provide alternating weak and strong stimuli of the same type to the animal.

* * * * *